(12) United States Patent
Ribarich (10) Patent No.: US 7,753,558 B2
(45) Date of Patent: Jul. 13, 2010

(54) COMPACT FLUORESCENT LAMP PACKAGE

(75) Inventor: Thomas J. Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 1004 days.

(21) Appl. No.: 10/678,004

(22) Filed: Oct. 2, 2003

(65) Prior Publication Data
US 2004/0109317 A1 Jun. 10, 2004

Related U.S. Application Data

(60) Provisional application No. 60/416,350, filed on Oct. 4, 2002.

(51) Int. Cl.
*F21V 23/02* (2006.01)
(52) U.S. Cl. ........................................ 362/260
(58) Field of Classification Search .......... 362/260, 362/264, 363, 294, 373; 313/58, 59, 60, 313/61, 62, 49, 50, 51, 318.01, 318.11, 318.12; 439/620; 361/720, 760, 736; 174/260
See application file for complete search history.

(56) References Cited

U.S. PATENT DOCUMENTS

| | | | |
|---|---|---|---|
| 4,644,226 A | 2/1987 | Vernooij et al. | |
| 4,739,222 A * | 4/1988 | Nomoto et al. | 315/57 |
| 4,857,806 A | 8/1989 | Nilssen | |
| 4,961,027 A * | 10/1990 | Muessli | 315/58 |
| 5,030,890 A | 7/1991 | Johnson | |
| 5,049,785 A | 9/1991 | Shaffer | |
| 5,128,590 A | 7/1992 | Holzer | |
| 5,164,635 A * | 11/1992 | De Jong et al. | 315/58 |
| 5,294,865 A | 3/1994 | Haraden | |
| 5,485,057 A | 1/1996 | Smallwood et al. | |
| 5,504,394 A | 4/1996 | Johnson | |
| 5,545,950 A * | 8/1996 | Cho | 315/56 |
| 5,653,527 A | 8/1997 | Muessli | |
| 5,691,603 A | 11/1997 | Nilssen | |
| 5,703,440 A | 12/1997 | Kachmarik et al. | |
| 5,952,792 A | 9/1999 | Borowiec et al. | |
| 5,955,841 A * | 9/1999 | Moisin et al. | 315/56 |
| 5,961,204 A * | 10/1999 | Martich et al. | 362/295 |
| 5,971,564 A * | 10/1999 | Wang | 362/263 |
| 6,064,155 A | 5/2000 | Maya et al. | |
| 6,135,620 A | 10/2000 | Marsh | 362/377 |
| 6,150,761 A * | 11/2000 | Eberson et al. | 315/61 |
| 6,411,524 B1 * | 6/2002 | Chen et al. | 361/803 |

(Continued)

FOREIGN PATENT DOCUMENTS

EP 0 564 424 A2 10/1993

(Continued)

OTHER PUBLICATIONS

IAEEL Newsletter 1/98—New Ballast May Start CFL Revolution, Nils Borg, pp. 1-2.

*Primary Examiner*—Hargobind S Sawhney
(74) *Attorney, Agent, or Firm*—Farjami & Farjami LLP (57) ABSTRACT

A compact fluorescent lamp package is devised to have the same appearance and dimensions as a conventional incandescent light bulb. The compact fluorescent lamp package includes a base, a fluorescent lamp, a ballast circuit contained entirely in the base, and a diffuser cover.

19 Claims, 7 Drawing Sheets

U.S. PATENT DOCUMENTS

| | | | |
|---|---|---|---|
| 6,437,502 B1 * | 8/2002 | Nishio et al. | 313/493 |
| 6,443,769 B1 | 9/2002 | Nerone et al. | |
| 6,459,215 B1 | 10/2002 | Nerone et al. | |
| 6,492,773 B2 * | 12/2002 | Gyoten et al. | 315/56 |
| 6,494,730 B1 * | 12/2002 | Yan | 439/226 |
| 6,548,948 B1 | 4/2003 | Muessli | |
| 6,582,269 B2 * | 6/2003 | Sakai et al. | 445/26 |
| 6,616,310 B1 | 9/2003 | Marsh | 362/377 |
| 2002/0047612 A1 | 4/2002 | Matsui et al. | |
| 2002/0067139 A1 | 6/2002 | Sabate | |
| 2003/0179577 A1 | 9/2003 | Marsh | 362/260 |

FOREIGN PATENT DOCUMENTS

| | | |
|---|---|---|
| FR | 2631739 A1 | 11/1989 |
| JP | 11025751 A * | 1/1999 |
| WO | WO 00/22651 | 4/2000 |

\* cited by examiner

COMPACT FLUORESCENT LAMP PACKAGE

RELATED APPLICATION

This application is based on and claims benefit of U.S. Provisional Application No. 60/416,350, filed on Oct. 4, 2002, entitled COMPACT FLUORESCENT LAMP MULTI-CHIP MODULE SCREWBASE BALLAST, to which a claim of priority is hereby made.

BACKGROUND OF THE INVENTION

Figures 1, 2A, 2B:
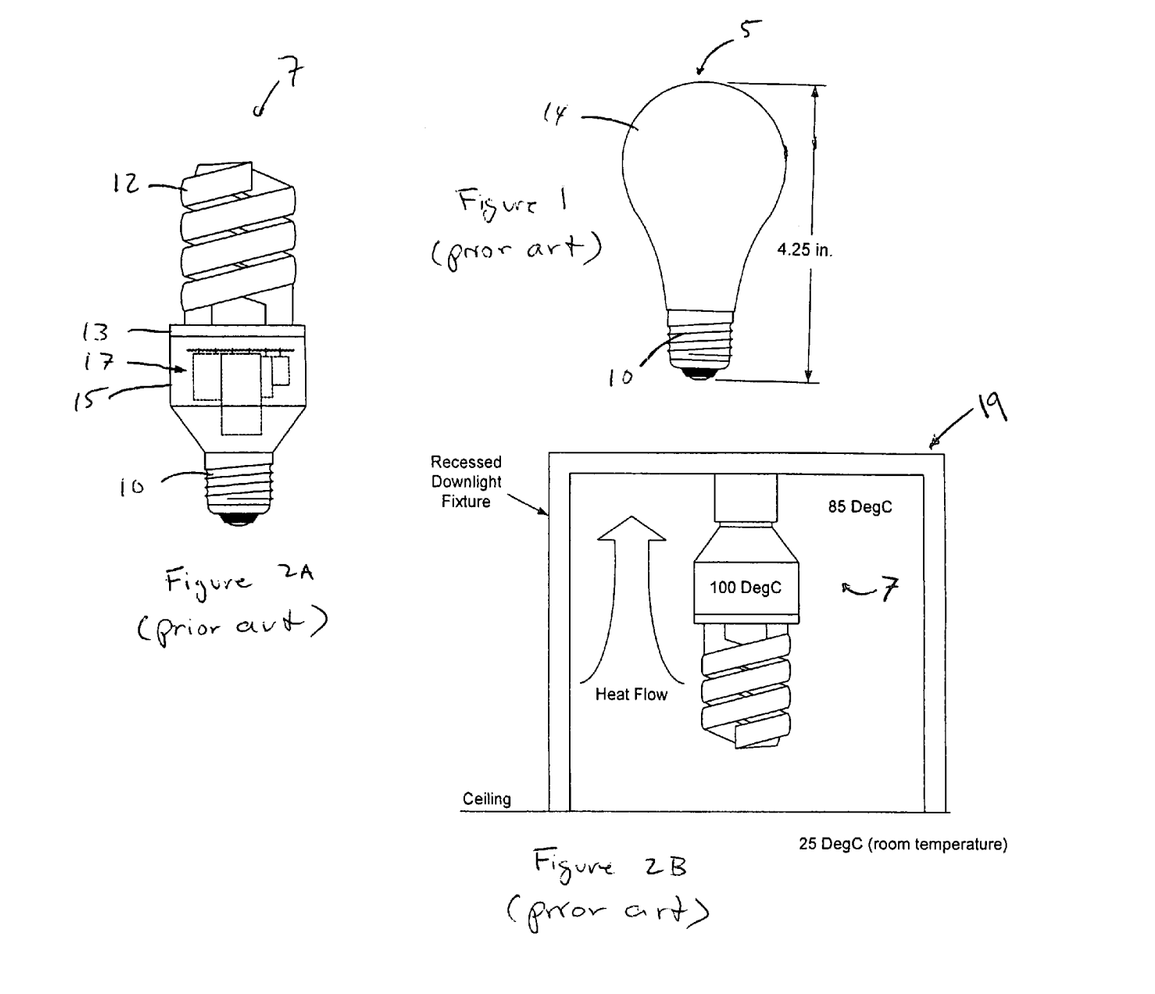
FIG. 1 shows a conventional incandescent light bulb.
FIG. 2A shows a conventional compact fluorescent lamp package.
FIG. 2B shows a conventional compact fluorescent lamp package as installed in a recessed downlight fixture.

Referring to FIG. 1, a conventional incandescent light bulb 5 includes base 10, and evacuated envelope or diffuser cover 14 (hereinafter "diffuser cover"). Diffuser cover 14, which is typically pear-shaped, surrounds a filament (not shown) that is electrically connected to base 10 for electrical connection to a conventional lamp socket. A well known base is an Edison screwbase, as shown, which is electrically connectable to an Edison screw socket.

In recent years, compact fluorescent lamp packages have been introduced into the market. These lamp packages are particularly desirable because of their energy efficiency.

Referring to FIG. 2A, a prior art compact fluorescent lamp package (CFLP) 7 consists of fluorescent lamp 12, lamp holder 13, auxiliary housing 15 for housing ballast 17 and interfacing between lamp holder 13 and base 10. In most CFLPs an Edison screwbase is used for a reliable mechanical and electrical connection to a standard Edison socket, although the sockets are known and used.

The typical height of a standard incandescent light bulb is about 4.5 in. A conventional CFLP due to its auxiliary elements such as auxiliary housing 15 is taller than a conventional incandescent light bulb 5. As a result, a conventional CFLP may extend out of a lamp shade or fixture adapted for an incandescent light bulb causing an undesirable appearance, or may not fit within an existing fixture.

Also, because ballast 17 is housed in auxiliary housing 15, the heat generated by ballast 17 cannot escape very efficiently. Referring, for example, to FIG. 2B, in a typical enclosure or downlight fixture 19, the heat generated from the lamp and ballast of a conventional CFLP 7 collects up in the fixture around the CFLP 7 without any path to escape.

As a result, there is a higher ambient temperature around CFLP 7 which causes the internal components of the CFLP 7, especially ballast 17, to run at even higher temperatures, e.g. above 150° C. The increase in the internal heat decreases reliability, causes field failures and limits the use of a conventional CFLP to open rather than enclosed fixtures all of which discourage the acceptance of CFLPs in the marketplace. In addition, the physical dimensions and the unusual appearance of conventional CFLPs are believed to adversely affect their desirability.

SUMMARY OF THE INVENTION

An object of the present invention is to provide a CFLP which enjoys the beneficial energy efficiency of other CFLPs, has better thermal characteristics than conventional CFLPs, and is able to be readily used in an application suitable for a conventional incandescent light bulb.

A CFLP according to the present invention is capable of having the appearance and dimensions of a conventional incandescent light bulb so that it may be used in any application suitable for a conventional incandescent light bulb.

Furthermore, a CFLP according to the present invention has improved heat dissipating characteristics.

Specifically, a CFLP according to the present invention includes a base, which is identical to a conventional base used by a conventional incandescent light bulb, a fluorescent lamp, a ballast circuit contained entirely in the base and operatively connected to the fluorescent lamp, and optionally a diffuser cover made from plastic or glass disposed around the fluorescent lamp.

According to an aspect of the present invention, the diffuser cover is shaped and sized to resemble a diffuser cover of a conventional incandescent light bulb.

According to another aspect of the present invention, the ballast circuit is integrated into a single multi-chip module (MCM), which is physically disposed entirely in the base, thereby eliminating the need for an auxiliary housing for the ballast.

The MCM used in the present invention includes a control IC, power MOSFETs, bridge rectifier diodes, resistors, capacitors and inductors all arranged on a two-sided circuit board which fits directly inside the base. The MCM is manufactured in two stages. In the first stage, chip-on-board technology and pick-and-place surface mount technology are employed to obtain a small control disk which serves as the ballast mother board. Additional components are then placed on the mother board to form the complete ballast in a second stage. The entire ballast can then be inserted into the base and the base can be filled with a thermal epoxy for mechanical stability, thermal management and protection against environmental damage such as moisture related damage, which allows a CFLP according to the present invention to be used in outdoor applications. The base thus serves as a heatsink with the threads of the screwbase acting as fins for allowing the heat to escape efficiently. The fluorescent lamp and optionally the diffuser cover are then mounted directly to the base such that the final product has the appearance of a conventional incandescent light bulb. A CFLP according to the invention:

1) decreases size and cost of a CFLP;
2) reduces component count of a ballast, for example, from 25 down to 7;
3) reduces the height of the final CFLP;
4) allows for final CFLP to have the appearance of a conventional light bulb;
5) utilizes natural heatsinking capabilities of the base which increases the maximum power limit of the ballast;
6) eliminates pick-and-place surface mounting step at final ballast production;
7) increases reliability and manufacturability; and
8) helps drive the adoption of CFLPs by the consumers.

Other features and advantages of the present invention will become apparent from the following description of the invention which refers to the accompanying drawings.

BRIEF DESCRIPTION OF THE DRAWINGS

FIG. 10 shows an opposing major surface of the circuit board shown by FIG. 9.

DETAILED DESCRIPTION OF EMBODIMENTS OF THE INVENTION

Figure 3:
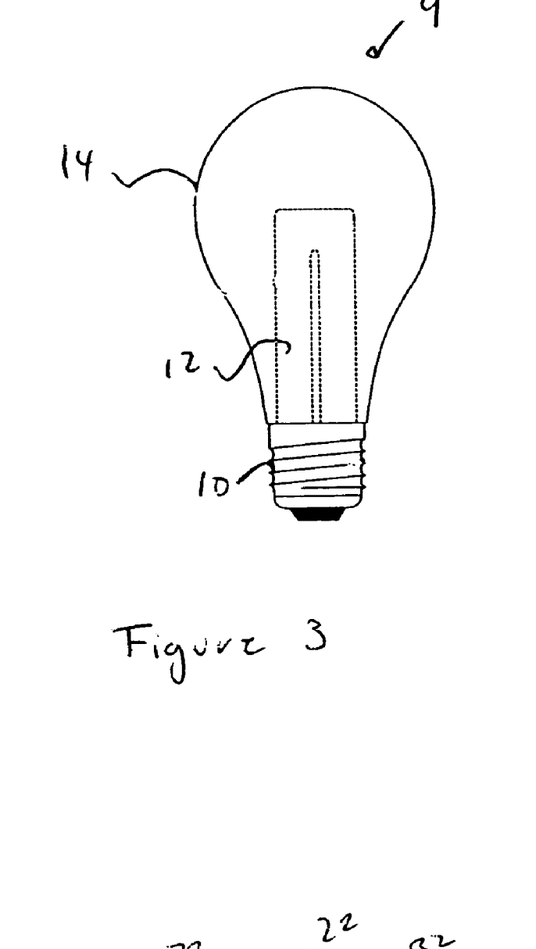
FIG. 3 shows a schematic of a compact fluorescent lamp package according to the present invention.

Referring to FIG. 3, a CFLP 9 according to the present invention includes base 10, fluorescent lamp 12, and preferably diffuser cover 14. Base 10 is adapted such that it may be received in a conventional electrical socket suited for receiving an ordinary incandescent light bulb. CFLP 9 according to a preferred embodiment utilizes a screw type base such as an Edison screwbase. Similar to an incandescent light bulb, base 10 in CFLP 9 is used as an electrical connector to the power line.

In the preferred embodiment of the present invention, fluorescent lamp 12 can be of any shape or size. Fluorescent lamp 12 may be, for example, U-shaped, double U-shaped, or spiral-shaped. According to the present invention any kind of fluorescent lamp 12 may be used with changing only a few electronic components selected according to the design requirements of the lamp as discussed later. Also diffuser cover 14 may be of any shape, size or color, and is made from an optically transmissive material such as glass or plastic.

According to one aspect of the present invention, diffuser cover 14 is shaped like a pear, which is a shape common to most incandescent light bulbs. As a result, CFLP 9 according to the present invention can be used in all applications suitable for a conventional incandescent light bulb.

According to another aspect of the present invention a complete ballast circuit for operating fluorescent lamp 12 is contained within base 10, thereby eliminating a need for an auxiliary compartment or similar element used in prior art devices.

Figure 4:
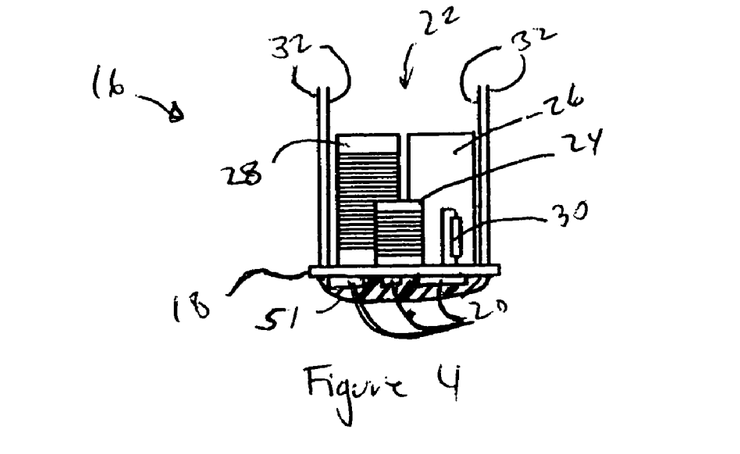
FIG. 4 schematically shows the physical external appearance of a multi-chip module used in a compact fluorescent lamp package according to the present invention.

As is well known, base 10 includes an open end leading to an interior open space. Referring to FIG. 4, according to an aspect of the present invention, multi-chip module (MCM) 16 includes a complete ballast circuit for operating fluorescent lamp 12, and is disposed entirely in the interior space of base 10 as will be described below.

In one embodiment, MCM 16 includes circuit board 18 which has disposed on one major surface thereof design independent electronic components 20, and on the second major surface thereof design dependent electronic components 22. In the context of the present invention, design dependent electronic components 22 are electronic components in a ballast circuit which must be selected to address a particular design goal. For example, an electronic component selected to correspond to a specific type of fluorescent lamp would be considered a design dependent component.

In the context of the present invention design independent components are those components in a ballast circuit which are not varied, but are common to ballast circuits regardless of the design goals. In this context, for example, a controller IC or power MOSFETs may be considered design independent electronic components, in that, regardless of design goals, these components need not be varied when the ballast circuit is modified to address particular design goal. Design independent electronic components 20 are those components that form a general purpose motherboard which can then be completed into an MCM carrying a complete ballast circuit by integrating design dependent electronic components 22, which when added to the motherboard form a ballast circuit of a particular design.

Design dependent electronic components 22 include, for example, filter inductor 24, bus capacitor 26, resonant inductor 28, and fuse 30. Disposed on the second major surface are a plurality of terminals 32 which are to be connected to filament connections of fluorescent lamp 12.

Design dependent electronic components 22 are operatively connected to design independent electronic components 20 through-holes in circuit board 18. By placing the physically larger design dependent electronic elements 22 such as inductors and capacitors on one side of circuit board 18 and physically smaller and flatter design independent electronic components 20 on an opposing surface of circuit board 18, MCM 16 is adapted to fit within base 10, thereby allowing for the elimination of auxiliary compartments as required by prior art devices. In the preferred embodiment, design dependent electronic components 22 are disposed on the surface of circuit board 18 facing away from the bottom of base 10 (top surface) while design independent electronic components 20 are disposed on the opposing face (bottom surface). These components may reverse positions without deviating from the present invention.

It should be noted that design dependent components 22 can be surface mounted without through-holes. Surface mounting on both sides may be attractive for high-volume, high-throughput manufacturing environments where the entire manufacturing process is fully automated.

Although the embodiment described shows the design dependent design, independent components on separate sides of the circuit board, one of skill in the art will appreciate that this is not a requirement, and these two types of components may be disposed on different sides of the circuit board as appropriate to allow the ballast to be housed in the lamp base.

Figure 5:
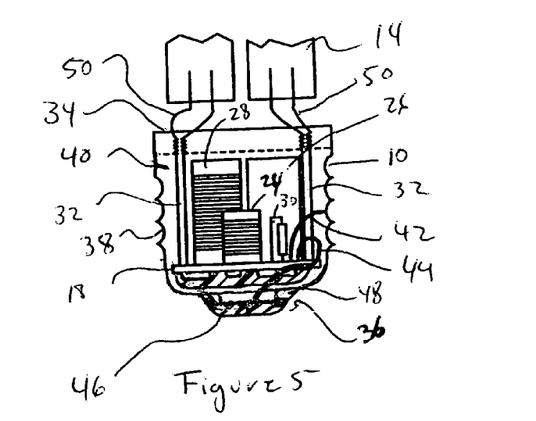
FIG. 5 shows the multi-chip module of FIG. 4 as installed in a conventional base of a conventional incandescent light bulb but employed in a CFLP.

Referring now to FIG. 5, base 10 includes an open end 34, a closed end 36, and a wall 38 surrounding closed end 36. Wall 38 surrounds a space within which MCM 16 is entirely disposed as shown by FIG. 5. The space enclosed by wall 38 is filled with thermal epoxy 40 to provide mechanical stability for MCM 16 within base 10 and to allow heat generated by the electronic devices included with MCM 16 to be transferred more efficiently to wall 38 so that the heat may be dissipated. Thus, base 10 may function as a heatsink for MCM 16. It should be noted that depending on the final temperatures of the components on MCM 16, and other factors such as the requirements of the final application and the lifetime of the components the use of thermal epoxy 40 may be avoided.

Also, wall 38 functions as an electrical connector for connecting MCM 16 to one pole of the power line. Specifically, in the preferred embodiment of the present invention MCM 16 is connected to the neutral pole via preferably first electrical wire 42. Furthermore, MCM 16 is electrically connectable to the live pole via a second wire 44, which is electrically connected to connector 46. Connector 46 is electrically insulated form wall 38 by insulation ring 48. Together, insulation ring 48 and connector 46 form closed end 36 of base 10.

Also, as shown by FIG. 5, terminals 32 extend out of thermal epoxy 34 and are electrically connected to respective filaments 50 of fluorescent lamp 14.

Figure 6:
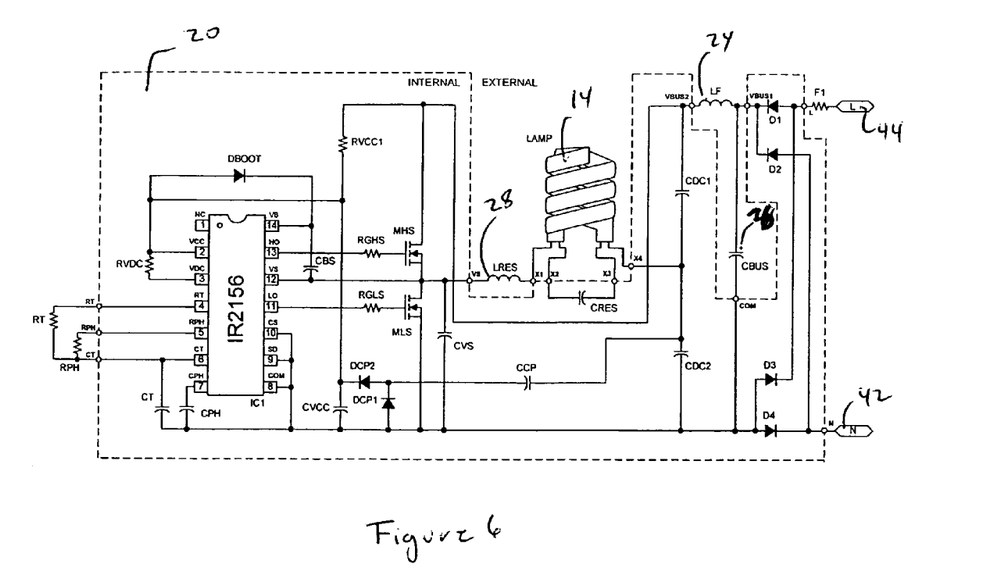
FIG. 6 shows a ballast circuit diagram incorporated in a multi-chip module that is used in the preferred embodiment of the present invention.

Referring now to FIG. 6, the ballast circuit used to control CFLP 9 according to the present invention includes a bridge rectifier for AC mains voltage rectification (D1, D2, D3, D4), DC bus capacitor 26 (CBUS) for smoothing the rectified input voltage, filter inductor 24 (LF) for blocking high-frequency noise, a half-bridge comprised of two power MOSFETs (MHS, MLS), a resonant output stage (CVS, CDC, LRES 28, CRES) necessary for preheating the lamp filaments, ignition of the lamp and controlling the lamp power, and a control IC (ICI) with additional passive components (CVCC, CT, CPH, RT, RPH, RSUPPLY, CB, DB, CCP DCP1, DCP2) for controlling the half-bridge MOSFETs, generating the supply voltage for the IC and programming the ballast preheat, ignition and running operating points. In the preferred embodiment, control IC (ICI) is an integrated circuit sold by the assignee of the present invention under the designation IR2156. The ballast circuit shown by FIG. 6 and its operation are known to those of skill in the art and will not be discussed in detail here. It should be noted other ballast circuits can be used in CFLP 9 without departing from the scope and spirit of the present invention.

The components within the dashed line are design independent electronic components 20 which are preferably disposed on one surface of circuit board 18 in MCM 16. The components outside the dashed line are design dependent electronic components 22 and include bus capacitor 26 (CBUS), filter inductor 24 (LF), LRES or resonant inductor 28, and certain other components that can be changed to correspond to the requirements of fluorescent lamp 14, e.g., resistors RT or RPH. With the particular ballast circuit shown design dependent electronic components 22 which are selected to meet the particular parameters of the ballast include RPH, which is selected to set the preheat frequency, RT, which is selected to set the running frequency and LRES or resonant inductor 28, which is selected to correspond to the lamp power. A fuse F1 may also be provided for protection.

According to a preferred method, the passive components in the design independent electronic components 20 are mounted to circuit board 18 using standard pick-and-place surface mount technology. The silicon components (e.g. ICI, MHS, MLS, the diodes) are mounted using chip-on-board multi-chip module technology which includes mounting the silicon components onto circuit board 18 with epoxy or solder and then making the electrical connections with wirebonds from the pads located on the silicon component to the receiving pads on the circuit board 18.

Figures 7, 8:
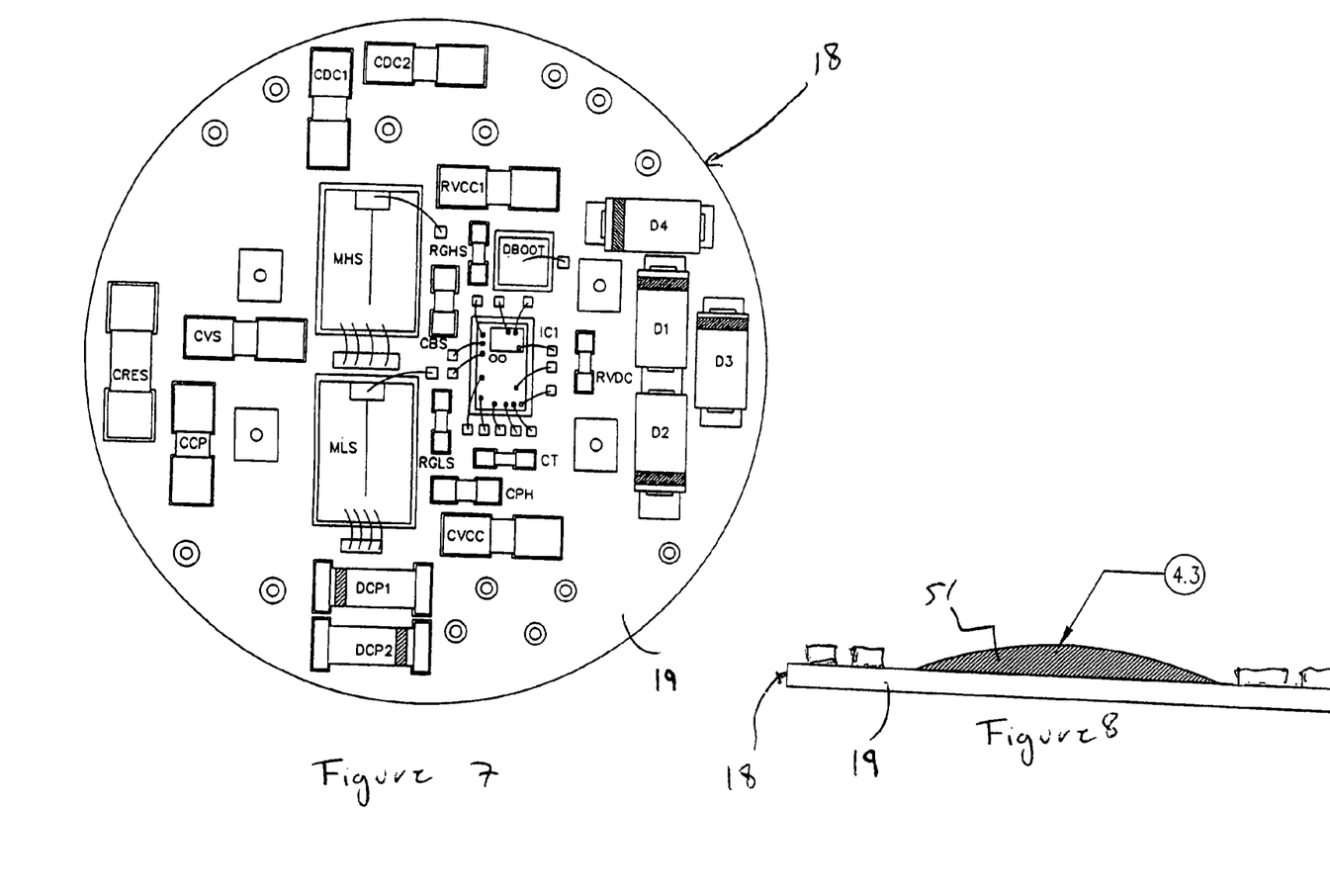
FIG. 7 shows a plan view of the bottom surface of a multi-chip module (without a protective mold) as used in the present invention illustrating the positioning of the electronic components that form a motherboard for a multi-chip module according to the present invention.
FIG. 8 shows a side elevation view of a circuit board used in the multi-chip module of the present invention, after forming a protective cover over the components shown in FIG. 7.

Referring to FIG. 7, the position of each of the components 20 on circuit board 18 in the preferred embodiment of the present invention is shown. It should be noted that the actual components may take a variety of forms. For example, in the embodiment shown herein, the bridge diodes D1, D2, D3, D4 are shown as packaged components which are placed using standard pick-and-place surface mount techniques. However, in an alternative embodiment, the bridge diodes D1, D2, D3, D4 can be in die form and mounted in a manner similar to the other silicon components. In this alternative embodiment, wirebonds can be used for connecting the diode die within the circuit. The wirebonds themselves can then be used as the protective fuse in the circuit. That is, the wirebonds open in response to excessive current. The current level at which the wirebonds open can be adjusted by adding additional wirebonds in parallel. This technique eliminates the need for an additional external fuse and further reduces component count and cost.

Table 1 below lists the components that may be used to implement an example of a CFLP according to the present invention having an 11 W U-shaped fluorescent lamp with the mains input to the ballast at 220 VAC (50 or 60 Hz).

TABLE 1

| PART | DESCRIPTION | QUANTITY |
|---|---|---|
| MHS, MLS | IRF730 DIE | 1 |
| DB00T | 1 A, 600 V, DIE | 1 |
| DCP1, DCP2 | 50 V | 2 |
| D1, D2, D3, D4 | 1 A, 1000 V | 4 |
| RVCC1 | 470 KOHM, 1/10 W, 5%, 0805, CERAMIC | 1 |
| RVDC | 20 KOHM, 1/16 W, 5%, 0402, CERAMIC | 1 |
| RGLS, RGHS | 10 OHM, 1/16 W, 5%, 0402, CERAMIC | 2 |
| CVCC | 0.047 µF, 16 V, 10%, 0805, X7R | 1 |
| CBS | 0.1 µF, 16 V, 10%, 0603, X7R | 1 |
| CRES | 3.3 nF, 1 KV, 5%, 1206, X7R | 1 |
| CDC1, CDC2 | 0.047 µF, 250 V, 10%, 0805, X7R | 2 |
| CCP | 0.01 µF, 250 V, 10%, 0805, X7R | 1 |
| CVS | 680 pF, 630 V, 10%, 0805, X7R | 1 |
| CT | 560 pF, 150 V, 5%, 0603, NPO | 1 |
| CPH | 0.22 µF, 16 V, 10%, 0603, X7R | 1 |
| STENCIL PATTERN ON CIRCUIT BOARD | STENCIL PATTERN, STAINLESS STEEL, .006THK. | 1 |
| TYPE OF SOLDER | MULTICORE, Sn/Sb (95/5) | A/R |
| CIRCUIT BOARD | FR4 RESIN, 2 LAYER PCB, IMM THK, 22 M | 1 |
| POTTING COMPOUND | DEXTER POTTING MATERIAL | A/R |
| WIRE BONDS | TANAKA GOLD WIRE 99.99%, Au, 1.3 MILS | 24 |
| CONTROLLER DIE | IR-UNISEM DIE (.070 × .125 × .013) | 1 |
| CONDUCTIVE EPOXY | ABLEBOND 84 LMI SR4 | A/R |
| LRES | 2.3 mH | 1 |
| LF | 1 mH | 1 |

According to an aspect of the present invention, after the components have been placed, at least a portion of the bottom is covered with plastic molding 51 as shown by FIG. 8. Specifically, plastic molding 51 covers all the components except the through-holes when through-holes are provided.

Figure 9:
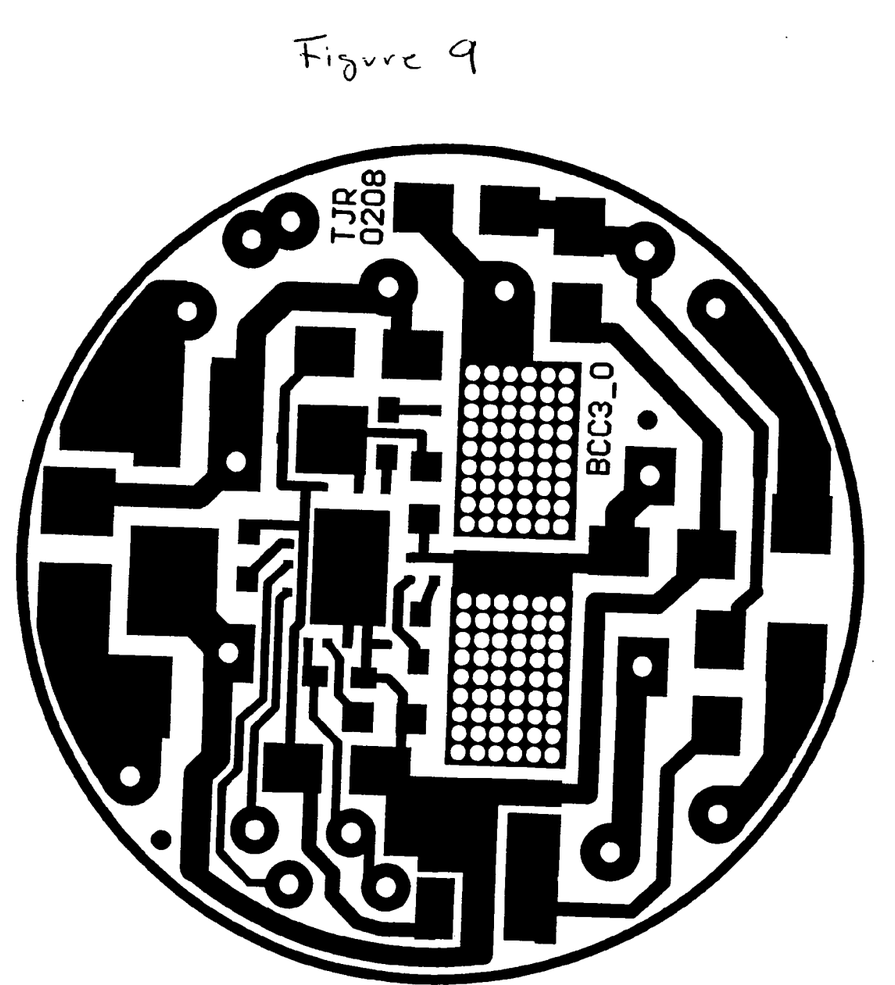
FIG. 9 shows a major surface of a circuit board used in a preferred embodiment of the present invention.

Referring to FIG. 9, the bottom surface of circuit board 18 in the preferred embodiment of the present invention includes pads for mounting the components and the interconnecting signal traces between the components connected according to the circuit diagram shown in FIG. 6.

Referring now to FIG. 10, the top surface of circuit board 18 includes two copper plates 52 each connected by a plurality of copper plated vias to the drain contact of a respective one of power MOSFETs (MHS, MLS). Copper plates 52 serve as heatsinks for power MOSFETs (MHS, MLS) and the copper plated vias serve as thermal connectors for transmitting heat from the power MOSFETs (MHS, MLS) to the copper plates 52.

Figure 11:
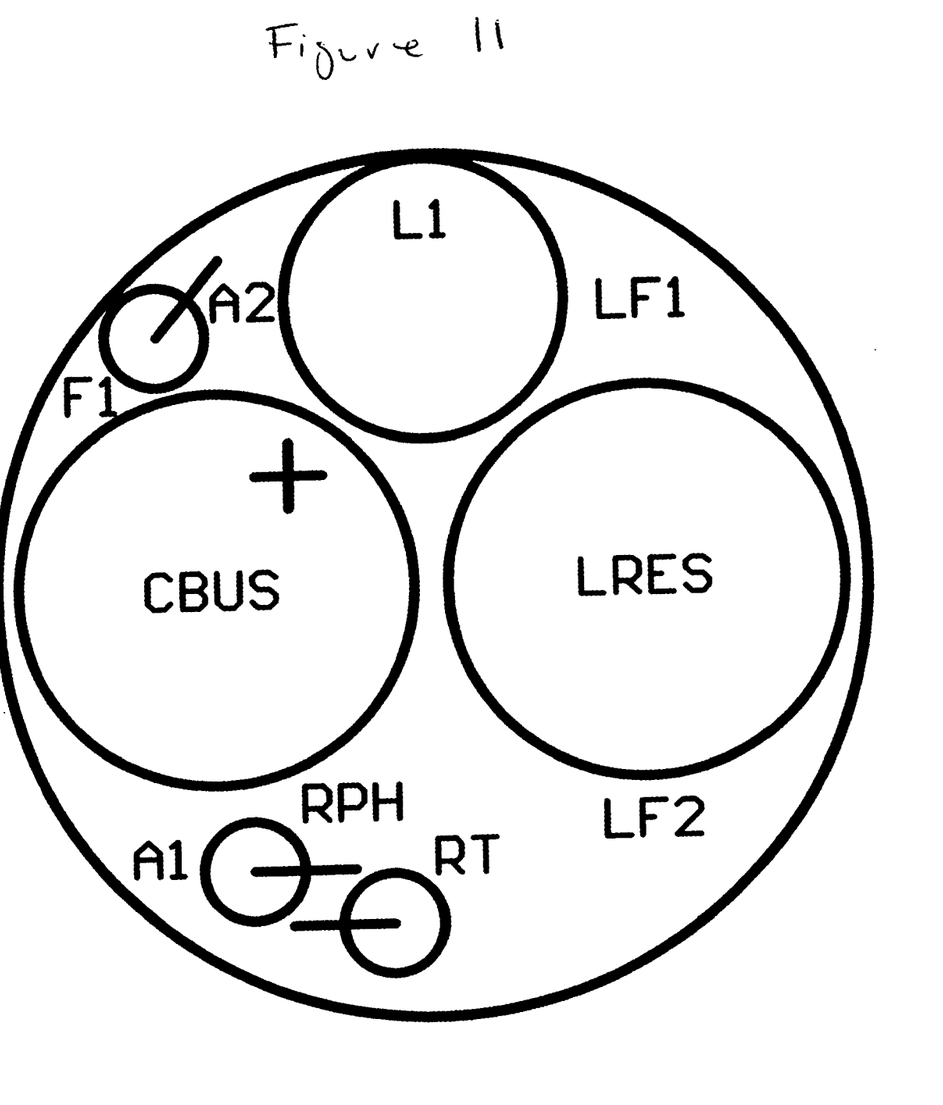
FIG. 11 shows the placement of electronic components on the surface of the circuit board opposite to the surface shown by FIG. 7.

Also, shown in FIG. 10, are holes 54 which are used to connect design dependent electronic components 22 to the remainder of the circuit elements residing on the bottom surface of circuit board 18. FIG. 11 shows the relative positions of design dependent electronic components 22 on the top surface of circuit board 18.

It should be noted that circuit board 18 in the preferred embodiment of the present invention is circular. Such shape, however, is not critical. Other shapes such as, for example, rectangular shapes can also be employed without departing from the scope of the present invention. Furthermore, body 19 of circuit board 18 may be formed from a polymer, although other suitable materials may be used without deviating from the present invention.

According to an aspect of the invention MCM 16 according to the present invention may be manufactured by first installing design independent circuit elements 20 and covering the same with plastic molding 51 in a first stage of production. In this stage a general purpose motherboard is formed.

Next, design independent circuit elements 22 are installed in a second stage of production. The second stage of production can take place at a ballast manufacturer's site where design dependent circuit elements 22 that are selected for each particular design can be installed. Thus, a general purpose type module is manufactured in the first stage of the manufacturing of MCM 16, and then MCM 16 for a particular purpose can be manufactured in the second stage by installing design dependent circuit elements.

According to an aspect of the present invention, once design dependent circuit elements 22 are disposed on the top side of circuit board 18, the entire structure is passed through a solder bath to electrically connect and mechanically secure the design dependent circuit elements 22 to circuit board 18. Thus, the second stage would only require a single step for connecting the design dependent electronic components 22 to the other components in the ballast circuit. It is to be noted a solder bath is possible because design independent elements are covered with plastic molding 50.

Manufacturing MCM 16 in a first stage and second stage as described herein alleviates the need to employ a pick-and-place technique for installing the design dependent circuit elements 22, thus, making MCM 16 very attractive to production sites where hand-insertion techniques are practiced, in that no additional investment is required by the manufacturer for purchasing costly surface mount pick-and-place equipment.

In another embodiment, only silicon components may be attached, wire-bonded (if required) and covered with plastic molding 51 in the first stage, and the remaining surface mounted components may be installed to form MCM 16 in the second stage. Such an embodiment provides flexibility for those manufacturer's who enjoy surface mounting capability and prefer to acquire their own surface mounted components. Very high volume productions may adopt this alternative embodiment for more economical results.

Once MCM 16 is formed, it is inserted into the interior of base 10. Base 10 may be an ordinary Edison screwbase or any other conventional base, screw type or otherwise, which is used for a conventional incandescent light bulb. Wires 42, 44 are then connected as described above, and the interior of base 10 is then potted with thermal epoxy 40 so that the heat generated by the components in MCM 16 can escape through base 10. The MCM is connected to the fluorescent lamp, either before or after insertion of MCM 16 in the base 10. Diffuser 14 is suitably attached to base 10 after MCM 16 is installed in base 10 to complete the package. Thus, diffuser 14 and fluorescent lamp 12 are attached directly to base 10 eliminating the need for an auxiliary section as required in prior art CFLPs.

In an alternative embodiment a small plastic collar may be inserted between base 10 and diffuser 14 to ease joining, for example, glass to metal, and also when diffuser 14 has a wider mouth than the diameter of base 10 in order to receive fluorescent lamp 12. Alternatively, a small collar can be used to hold fluorescent lamp 12 and diffuser 14 and act as the interface for joining fluorescent lamp 12 and diffuser 14 to base 10. The final technique used will depend on the preference at the final manufacturing site.

In an alternative embodiment, diffuser 14 may be omitted if the height of fluorescent lamp 12 is low enough so that it does not protrude outside a fixture as prior art CFLPs.

In an additional embodiment, diffuser 14 may be in two pieces separable at a point along its body to allow for the insertion of larger fluorescent lamps or a fluorescent lamp with a unique geometry. That is, diffuser 14 may have an open top allowing for the insertion of fluorescent lamp 12 from the top.

It should be noted that MCM 16 is not limited to the form disclosed herein, but may be implemented using other forms. For example, MCM 16 may be implemented using two cooperatively connected circuit boards, such as, a motherboard/daughterboard arrangement. Also, MCM 16 may be arranged inside base 10 in any manner, for example, vertical sideways, horizontal bottom down, and horizontal bottom up.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A compact fluorescent lamp package comprising:
a screw base for electrically connecting said lamp package to an electrical socket which is capable of receiving a screw base of an ordinary incandescent lamp, said screw base including an open end and a closed end and a wall surrounding said closed end to provide an enclosure around a space;
a multi-chip module including a complete ballast circuit formed on a circuit board contained inside said screw base and electrically connected to said screw base to receive power through said screw base, said circuit board including opposing surfaces, one surface facing said opening and the other surface facing said closed end;
a thermally conductive body disposed around said ballast circuit and supporting said multi-clip module within said screw base, and thermally connecting said wall of said screw base to said ballast circuit directly, whereby said screw base may dissipate heat generated by said ballast circuit; and a fluorescent lamp extending away from said screw base and operatively connected to said ballast circuit; wherein said multi-chip module is formed on a single circuit board.

2. A compact fluorescent lamp package according to claim 1, further comprising a diffuser cover disposed around said fluorescent lamp and directly connected to said screw base to provide said lamp package with an appearance of an ordinary incandescent lamp.

3. A compact fluorescent lamp package according to claim 1, wherein said screw base is an Edison screw base.

4. A compact fluorescent lamp package according to claim 1, wherein said ballast circuit includes elements disposed on both sides of said circuit board.

5. A compact fluorescent lamp package according to claim 4, wherein said elements include design dependent electronic components and design independent electronic components, said design dependent electronic components being disposed on one side of said circuit board and said design independent electronic components being disposed on another opposing side of said circuit board.

6. A compact fluorescent lamp package according to claim 4, wherein said design dependent electronic components include a filter inductor, a resonant inductor, a capacitor, and said design independent electronic components include power switching devices.

7. A compact fluorescent lamp package according to claim 1, wherein said thermally conductive body is a thermal epoxy which is disposed in said space in said base for mechanical stability and thermal management.

8. A compact fluorescent lamp package according to claim 1, wherein said multi-chip module comprises a circuit board that has a perimeter that generally follows the contour of the wall of said base.

9. A compact fluorescent lamp package according to claim 1, wherein said multi-chip module is formed on a generally circular circuit board.

10. A compact fluorescent lamp package according to claim 1, wherein said multi-chip module is formed on a generally rectangular circuit board.

11. A compact fluorescent lamp package according to claim 1, wherein said wall of said base serves as a connector for connecting said lamp to one pole of a power line, and said closed end of said base includes a connector insulated from said wall serving as a connector for connecting to another pole of said power line.

12. A compact fluorescent lamp package according to claim 1, wherein said multi-chip module is electrically connected to said wall of said screw base via a first electrical wire and electrically connected to a connector disposed on said end of said screw base via a second electrical wire.

13. A compact fluorescent lamp package according to claim 1, wherein said fluorescent lamp is connected to said multi-chip module via respective filament terminals.

14. A compact fluorescent lamp package according to claim 1, wherein said multi-chip module includes a circuit board having at least one heatsink disposed on one major surface thereof, said heatsink being thermally connected through said circuit board to a heat-generating electronic component.

15. A compact fluorescent lamp comprising:

a screw base configured to be received in an electrical socket, said screw base having a bottom portion and an annular wall extending from said bottom portion and disposed around a space, said screw base being configured for external electrical connection;

a circuit board disposed in said space and having two opposing surfaces one of said surfaces facing said bottom portion;

an electronic ballast circuit including a plurality of electronic components, said components being disposed on both surfaces of said circuit board, said electronic ballast being electrically connected to said screw base to receive power;

a thermally conductive body disposed within and supporting said circuit board inside said screw base and in direct thermal contact with said electronic ballast circuit and said annular wall of said base thereby thermally connecting said ballast circuit and said screw base;

a fluorescent lamp operatively connected to said electronic ballast; and a diffuser cover directly attached to said screw base and surrounding said fluorescent lamp without an intermediate compartment disposed therebetween; wherein said multi-chip module is formed on a single circuit board.

16. A compact fluorescent lamp according to claim 15, wherein said screw base is an Edison screw base.

17. A compact fluorescent lamp according to claim 15, wherein said diffuser cover is shaped like an ordinary incandescent light bulb.

18. A compact fluorescent lamp according to claim 15, wherein said electronic ballast circuit is disposed entirely within said screw base.

19. A compact fluorescent lamp according to claim 15, wherein said thermally conductive body comprises a thermal epoxy.

* * * * *